United States Patent
Deforet et al.

(10) Patent No.: US 11,518,533 B2
(45) Date of Patent: *Dec. 6, 2022

(54) FRONT ENGINE ATTACHMENT SYSTEM FOR AN AIRCRAFT ENGINE, HAVING A BEAM MADE IN THREE PARTS

(71) Applicant: Airbus Operations SAS, Toulouse (FR)

(72) Inventors: Thomas Deforet, Toulouse (FR); Rémi Lansiaux, Toulouse (FR); Olivier Dubois, Toulouse (FR); Jacky Puech, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 258 days.

This patent is subject to a terminal disclaimer.

(21) Appl. No.: 16/878,015

(22) Filed: May 19, 2020

(65) Prior Publication Data
US 2020/0385132 A1 Dec. 10, 2020

(30) Foreign Application Priority Data
May 21, 2019 (FR) ...................................... 1905338

(51) Int. Cl.
*B64D 27/26* (2006.01)

(52) U.S. Cl.
CPC ........ *B64D 27/26* (2013.01); *B64D 2027/264* (2013.01); *B64D 2027/268* (2013.01)

(58) Field of Classification Search
CPC ..... B64D 27/26; B64D 27/264; B64D 27/268
See application file for complete search history.

(56) References Cited

U.S. PATENT DOCUMENTS

| 6,474,597 B1 * | 11/2002 | Cazenave | B64D 27/26 244/54 |
| 2008/0272229 A1 * | 11/2008 | Lafont | B64D 27/26 244/54 |

(Continued)

FOREIGN PATENT DOCUMENTS

| FR | 2914907 A1 | 10/2008 |
| FR | 3061480 A1 | 7/2018 |
| FR | 3073205 A1 | 5/2019 |

OTHER PUBLICATIONS

French Search Report; priority document.
This application is subject matter related to U.S. Appl. No. 16/883,247 and U.S. Appl. No. 16/883,247.

*Primary Examiner* — Richard R. Green
*Assistant Examiner* — Steven J Shur
(74) *Attorney, Agent, or Firm* — Greer, Burns & Crain, Ltd.

(57) ABSTRACT

A front engine attachment system for an aircraft engine, the front engine attachment system having an engine pylon having, in its front part, a frontal part having an attachment wall with a front face, and a front engine attachment having a beam fastened to the front face and to which a link-rod system is fastened on either side of a median plane. The beam has front, intermediate and rear plates. The rear plate is pressed against the front face. The front plate is disposed in front of the rear plate. The intermediate plate is disposed between the front plate and the rear plate. Each link-rod system is fastened to the intermediate plate in an articulated manner by at least one first connection point and is configured to be fastened to a front part of the engine in an articulated manner by at least one second connection point.

5 Claims, 3 Drawing Sheets

(56) References Cited

U.S. PATENT DOCUMENTS

| | | | |
|---|---|---|---|
| 2009/0032673 A1* | 2/2009 | Dron .................... | B64D 27/26 248/557 |
| 2014/0183298 A1* | 7/2014 | Brochard ............... | B64D 27/26 244/54 |
| 2018/0186462 A1 | 7/2018 | Brochard | |

* cited by examiner

and wherein each link-rod system is fastened only to the intermediate plate in an articulated manner by at least one first connection point and is intended to be fastened to a front part of the engine in an articulated manner by at least one second connection point.

FRONT ENGINE ATTACHMENT SYSTEM FOR AN AIRCRAFT ENGINE, HAVING A BEAM MADE IN THREE PARTS

CROSS-REFERENCES TO RELATED APPLICATIONS

This application claims the benefit of the French patent application No. 1905338 filed on May 21, 2019, the entire disclosures of which are incorporated herein by way of reference.

FIELD OF THE INVENTION

The present invention relates to a front engine attachment system for an aircraft engine, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fastened to the structure of the wing and extends below the wing, and the engine is suspended beneath the engine pylon.

The engine is fastened to the engine pylon via an engine attachment system comprising a front engine attachment and a rear engine attachment.

The front engine attachment has, for example, a beam that is fastened to a front face of the engine pylon and two link rods that are fastened between the beam and a front casing of the engine. Each link rod is equipped with ball joints that are made up of two cut-off and paired balls.

Each link rod and the beam define, in combination, a primary load path between the engine and the engine pylon, so as to withstand the loads of the engine under normal operating conditions of the engine.

Such a beam is a solid component, obtained by machining a component obtained by forging. The method for obtaining this beam is relatively long and complex.

Although such a beam is satisfactory from the point of view of its use, it is necessary to find a different architecture so as to make its manufacture and implementation easier.

SUMMARY OF THE INVENTION

An object of the present invention is to propose a front engine attachment system of which the beam is in three parts so as to be easier to produce.

To this end, a front engine attachment system for an engine of an aircraft is proposed, the front engine attachment system having:
- an engine pylon having, in its front part, a frontal part having an attachment wall that has a front face, and
- a front engine attachment having a beam that is fastened to the front face and to which a link-rod system is fastened on either side of a median plane, wherein the beam is made up of a front plate, an intermediate plate and a rear plate, wherein the rear plate is pressed against the front face, wherein the front plate is disposed in front of the rear plate, and wherein the intermediate plate is disposed between the front plate and the rear plate, and wherein each link-rod system is fastened only to the intermediate plate in an articulated manner by at least one first connection point and is intended to be fastened to a front part of the engine in an articulated manner by at least one second connection point.

Such a front engine attachment system thus has a beam in three parts. Each of these three parts can thus be made from a component that is less heavy and easier to produce. Moreover, the shape of the link rods is also simplified.

Advantageously, the fastening of the beam to the front face of the attachment wall is realized by bolts, and each bolt passes through a bore in the attachment wall, a bore in the rear plate, a bore in the intermediate plate and a bore in the front plate.

Advantageously, each link-rod system comprises a front link rod and a rear link rod, each first connection point between the beam and a link-rod system takes the form of a clevis, one wall of the clevis is made up of the front link rod of the link-rod system, another wall of the clevis is made up of the rear link rod of the link-rod system, the intermediate plate is disposed between the two link rods, and a pin passes through a bore in each link rod and a bore in the intermediate plate.

Advantageously, the intermediate plate is mounted on the pin via a ball joint connection.

Advantageously, the front engine attachment system has, for each link-rod system, a backup safety fastening point that is activated in the event of failure of a primary load path and creates an auxiliary load path between the engine and the engine pylon, each backup safety fastening point is made up of a clevis, the front plate and the rear plate constitute the walls of the clevis, the engine is disposed between the front plate and the rear plate, a pin passes through a bore in the front plate, a bore in the engine and a bore in the rear plate, and the diameter of the bore in the engine is greater than the diameter of the pin.

The invention also proposes an aircraft having a structure, an engine and a front engine attachment system according to one of the preceding variants, wherein the engine pylon is fastened to the structure, and wherein a front part of the engine is fastened to the at least one second connection point.

BRIEF DESCRIPTION OF THE DRAWINGS

The above-mentioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
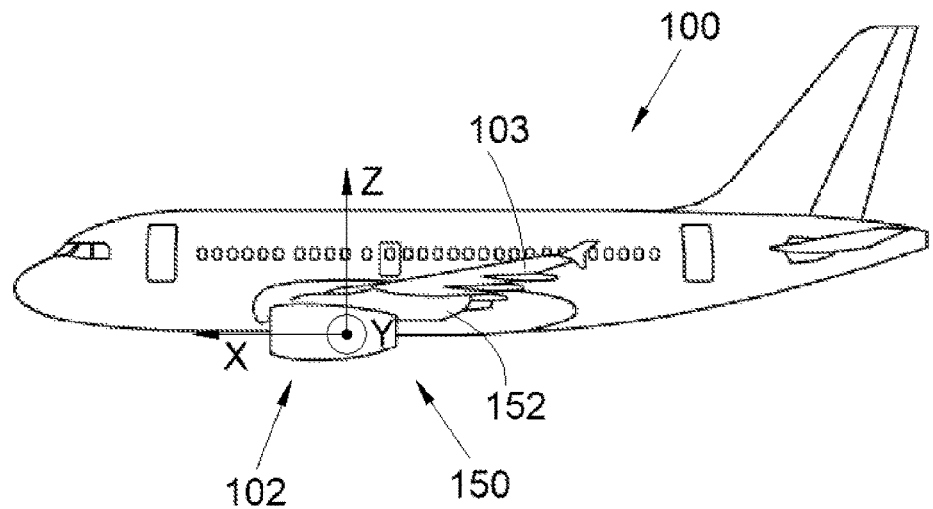
FIG. 1 is a side view of an aircraft according to the invention.

In the following description, terms relating to a position are considered in relation to an aircraft in a position of forward movement, i.e., as shown in FIG. 1.

FIG. 1 shows an aircraft 100, which has an engine 102, in particular a jet engine.

In the following description, and by convention, the X direction is the longitudinal direction of the engine 102, with positive orientation in the direction of forward movement of the aircraft 100, the Y direction is the transverse direction of the engine 102, which is horizontal when the aircraft is on the ground, and the Z direction is the vertical direction or vertical height when the aircraft is on the ground, these three directions X, Y and Z being mutually orthogonal.

In the embodiment of the invention that is shown in FIG. 1, the aircraft 100 has an engine 102 beneath each wing 103, but it is possible to provide a plurality of engines beneath each wing 103.

Beneath each wing 103, and for each engine 102, the aircraft 100 has a front engine attachment system 150 that is fastened to the structure of the wing 103 and extends beneath the wing 103 and supports the front part of the engine 102.

Figure 2:
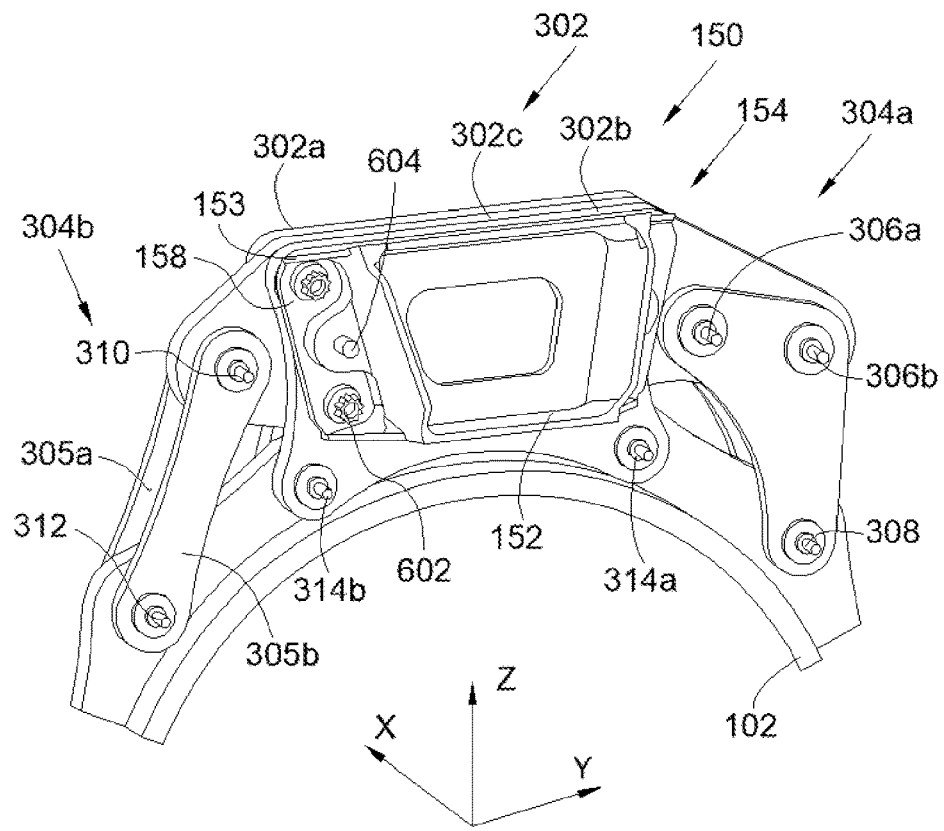
FIG. 2 is a perspective view of a front engine attachment system according to the invention.
Figure 3:
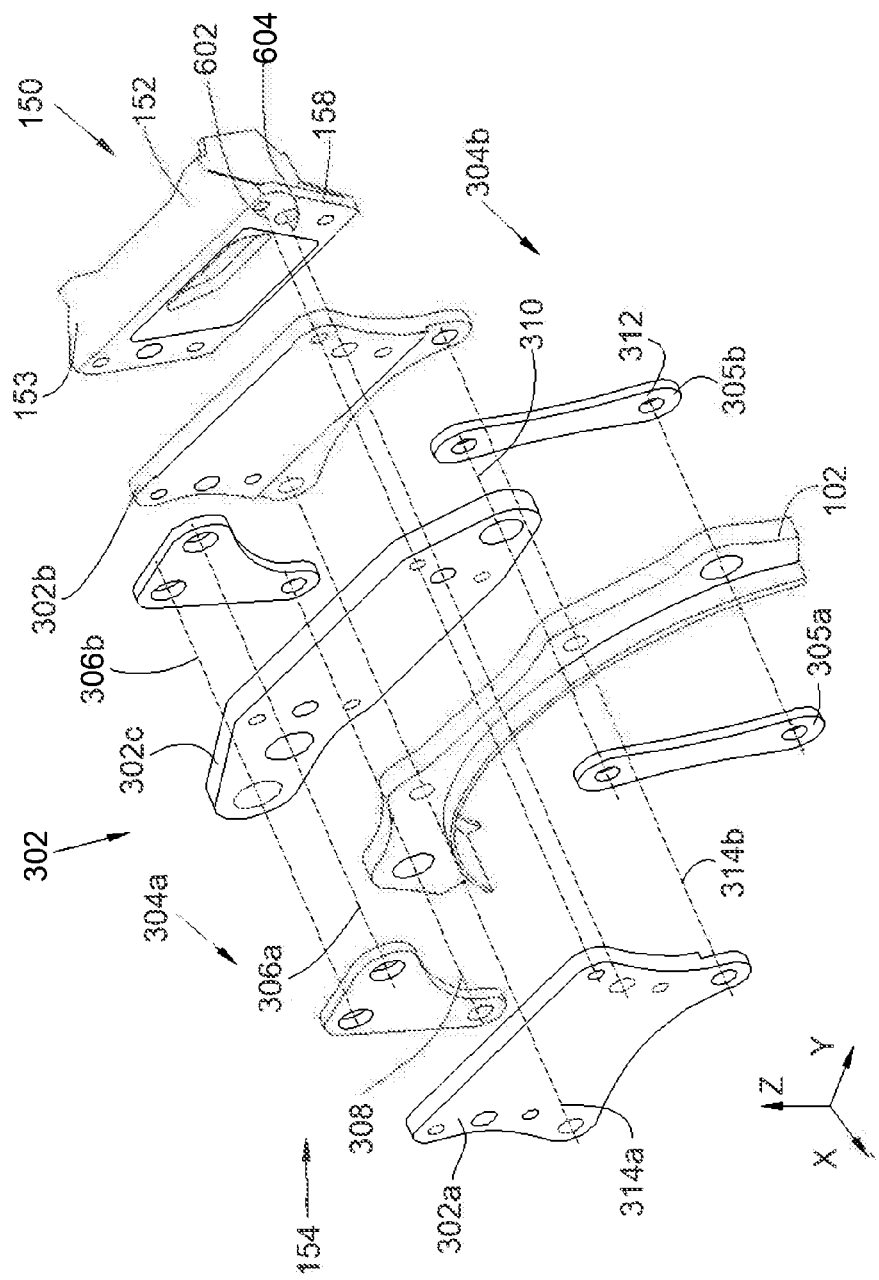
FIG. 3 is an exploded perspective view of the front engine attachment system in FIG. 2.

As shown in FIGS. 2 and 3, the front engine attachment system 150 comprises an engine pylon 152, which is fastened to the wing 103, and a front engine attachment 154, which is fastened to the engine pylon 152 and to which the front part of the engine 102 is fastened.

In a known manner, the engine pylon 152 takes, for example, the form of a box that has, inter alia, in its front part, a frontal part 153 that extends in a substantially vertical plane.

The front engine attachment 154 has a beam 302 to which a link-rod system 304*a-b* is fastened on either side of a median plane XZ.

In the embodiment of the invention that is presented here, the frontal part 153 has an attachment wall 158 that has a front face oriented towards the front of the aircraft 100.

According to the invention, the beam 302 is made up of a front plate 302*a*, a rear plate 302*b* and an intermediate plate 302*c* that are fastened together in a removable manner. The front plate 302*a* is disposed in front of the rear plate 302*b* and the rear plate 302*b* is pressed against the front face of the attachment wall 158. The intermediate plate 302*c* is disposed between the front plate 302*a* and the rear plate 302*b*.

The front plate 302*a*, the intermediate plate 302*c* and the rear plate 302*b* each extend in a plane parallel to the front face of the attachment wall 158 and are fastened to the attachment wall 158 by a series of bolts 602.

The production of the beam 302 from three plates 302*a-c* makes it easier to produce the beam 302 since the three plates 302*a-c* are effectively easier to produce, in particular since their thickness is smaller than the beam of the prior art.

The beam 302 is fastened to the front face of the attachment wall 158, in this case using bolts 602 that pass through a bore in the beam 302 and a bore in the attachment wall 158. In the embodiment of the invention that is presented here, there is a pair of bolts 602 disposed on the port side and a pair of bolts 602 installed on the starboard side, and each bolt 602 passes through a bore in the attachment wall 158, a bore in the rear plate 302*b*, a bore in the intermediate plate 302*c* and a bore in the front plate 302*a*.

The front engine attachment system 150 also has, in this case, shear pins 604 that pass through a bore in the attachment wall 158, a bore in the rear plate 302*b*, a bore in the intermediate plate 302*c* and a bore in the front plate 302*a*.

Each link-rod system 304*a-b* comprises a front link rod 305*a* and a rear link rod 305*b*. The two link rods 305*a-b* are mutually parallel and the front link rod 305*a* is disposed in front of the rear link rod 305*b* in the longitudinal direction X.

Each link rod 305*a-b* is in a plane that is generally parallel to the front face of the attachment wall 158.

Each link-rod system 304*a-b* is fastened to the intermediate plate 302*c* in an articulated manner by at least one first connection point 306*a-b*, 310, and is fastened to a front part of the engine 102, which is shown here by a part of its front casing, in an articulated manner by at least one second connection point 308, 312. Each link-rod system 304*a-b* is thus fastened only to the intermediate plate 302*c* by the at least one first connection point 306*a-b*, 310.

In the embodiment of the invention that is presented here, the first link-rod system 304*a* is fastened to the intermediate plate 302*c* by two first connection points 306*a-b* and to the engine 102 by a second connection point 308, and the second link-rod system 304*b* is fastened to the intermediate plate 302*c* by a first connection point 310 and to the engine 102 by a second connection point 312.

For each connection point 306*a-b*, 310, 308, 312, the connection between the link-rod system 304*a-b* and the intermediate plate 302*c*, or the engine 102, is realized by a clevis, wherein each link rod 305*a-b* of the link-rod system 304*a-b* constitutes a wall of the clevis and wherein the intermediate plate 302*c*, or the engine 102, is disposed between the two link rods 305*a-b*, wherein a pin passes through a bore in each link rod 305*a-b* and a bore in the intermediate plate 302*c*, or the engine 102, and wherein the intermediate plate 302*c*, or the engine 102, is mounted on the pin via a ball joint connection.

Figure 4:
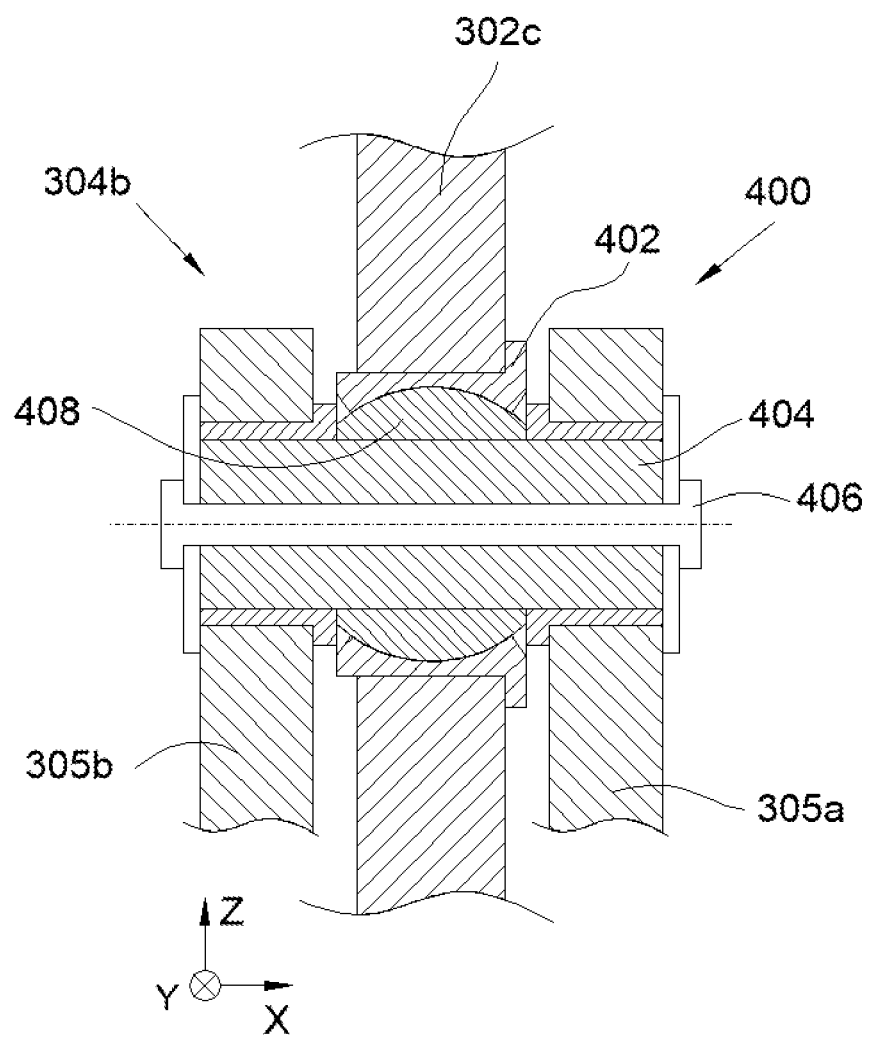
FIG. 4 is a cross-sectional view of a ball joint system at a connection point.

FIG. 4 shows a ball joint system 400 at the first connection point 310 between the link-rod system 304*b* and the intermediate plate 302*c*. The other connection points can take the same form, in particular at the engine 102.

The ball joint system 400 comprises a cage 402, which is fastened inside the bore in the intermediate plate 302*c*, for example by screwing, and the pin 404, which is fitted and fastened in the bore in the intermediate plate 302*c* and in the bores in the link rods 305*a-b*, in this case via bushings and a bolt 406 that sandwiches the link rods 305*a-b*, in this case via washers.

The cage 402 has a spherical inner surface and the pin 404 bears a spherical central boss 408 around which the cage 402 is disposed. Thus, there is freedom of movement between the link rods 305*a-b* and the intermediate plate 302*c*, the intermediate plate 302*c* and the cage 402 being able to pivot about the central portion 408.

Such an arrangement allows more robust behavior by protecting the housing from frictional wear, and ensures easier dismantling if need be.

Thus, in the embodiment of the invention presented here, each first connection point 306*a-b*, 310 between the beam 302 and a link-rod system 304*a-b* takes the form of a clevis, wherein one wall of the clevis is made up of the front link rod 305*a* of the link-rod system 304*a-b*, wherein the other wall of the clevis is made up of the rear link rod 305*b* of the link-rod system 304*a-b*, wherein the intermediate plate 302*c* is disposed between the two link rods 305*a-b*, and wherein a pin passes through a bore in each link rod 305*a-b* and a bore in the intermediate plate 302*c*.

In the same way, in the embodiment of the invention presented here, each second connection point 308, 312 between the engine 102 and a link-rod system 304*a-b* takes the form of a clevis, wherein one wall of the clevis is made up of the front link rod 305*a* of the link-rod system 304*a-b*, wherein the other wall of the clevis is made up of the rear link rod 305*b* of the link-rod system 304*a-b*, wherein the engine 102 is disposed between the two link rods 305*a-b*, and wherein a pin passes through a bore in each link rod 305*a-b* and a bore in the engine 102.

Each link rod system 304*a-b*, the intermediate plate 302*c* and the frontal part 153 define, in combination, a primary load path between the engine 102 and the engine pylon 152, so as to withstand the loads of the engine 102 under normal operating conditions of the engine 102.

For increased safety, the front engine attachment system 150 has, for each link-rod system 304a-b, an additional connection point 314a-b. The additional connection points 314a-b are disposed on either side of the median plane XZ, and each establish an additional connection between the front engine attachment system 150 and the engine 102. Each additional connection point 314a-b takes the form of a backup safety fastening point (or "waiting fail-safe") that will compensate for a failure of the primary load path, that is to say, of at least one of the link rods 305a-b. This means that when a component of the primary load path is damaged, the activation of a backup safety fastening point creates an auxiliary load path between the engine 102 and the engine pylon 152.

Each backup safety fastening point 314a-b is made up of a clevis, wherein the front plate 302a and the rear plate 302b constitute the walls of the clevis and wherein the engine 102 is disposed between the front plate 302a and the rear plate 302b, wherein a pin passes through a bore in the front plate 302a, a bore in the engine 102 and a bore in the rear plate 302b, wherein the diameter of the bore in the engine 102 is greater than the diameter of the pin. Thus, in normal operation there is no contact between the pin and the engine 102, and, if one of the link rods 305a-b breaks, the engine 102 will move and the pin then comes into contact with the engine 102.

For each of the clevises described above, the pin of the clevis is generally parallel to the longitudinal direction X.

Although not shown in the figures, the rear plate 302b, front plate 302a and intermediate plate 302c forming the beam are connected together by any appropriate and removable means, such as bolts, in order that the beam does not come apart when it is detached from the pylon. It is thus easier for operatives tasked with carrying out maintenance on the aircraft equipped with the front engine attachment system according to the invention to carry out their work.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system having:
    an engine pylon having, in a front part, a frontal part having an attachment wall that has a front face, and
    a front engine attachment having a beam that is fastened to the front face and to which a link-rod system is fastened on either side of a median plane,
    wherein the beam is made up of a front plate, an intermediate plate and a rear plate,
        wherein the rear plate is pressed against the front face,
        wherein the front plate is disposed in front of the rear plate, and
        wherein the intermediate plate is disposed between the front plate and the rear plate,
        wherein the front and rear plates contact the intermediate plate, and
    wherein each link-rod system is fastened only to the intermediate plate in an articulated manner by at least one first connection point and is configured to be fastened to a front part of the engine in an articulated manner by at least one second connection point,
    wherein each link-rod system comprises a front link rod and a rear link rod,
    wherein the front link rod and the rear link rod being mutually parallel,
    wherein the front link rod being disposed in front of the rear link rod in a longitudinal direction,
    wherein the front link rod and the rear link rod residing in a plane that is generally parallel to the front face of the attachment wall,
    wherein each at least one first connection point between the beam and the link-rod system is formed as a clevis,
    wherein one wall of said clevis is made up of the front link rod of said link-rod system,
    wherein another wall of said clevis is made up of the rear link rod of said link-rod system,
    wherein the intermediate plate is disposed between the front and rear link rods,
    wherein a pin passes through a bore in each link rod and a bore in the intermediate plate,
    wherein each link-rod system is fastened to the intermediate plate in an articulated manner by the at least one first connection point and is fastened to the front part of the engine in an articulated manner by at least one second connection point,
    wherein each link-rod system is fastened only to the intermediate plate by the at least one first connection point,
    wherein a first link-rod system is fastened to the intermediate plate by a first and a second first connection point and to the engine by one second connection point,
    wherein a second link-rod system is fastened to the intermediate plate by a third first connection point and to the engine by another second connection point.

2. The front engine attachment system according to claim 1,
    wherein the fastening of the beam to the front face of the attachment wall is realized by bolts, and
    wherein each bolt passes through a bore in the attachment wall, a bore in the rear plate, a bore in the intermediate plate and a bore in the front plate.

3. The front engine attachment system according to claim 1, wherein the intermediate plate is mounted on the pin via a ball joint connection.

4. The front engine attachment system according to claim 1,
    wherein it has, for each link-rod system, a backup safety fastening point that is activated upon a failure of a primary load path and creates an auxiliary load path between the engine and the engine pylon,
    wherein each backup safety fastening point is made up of a clevis,
    wherein the front plate and the rear plate constitute walls of the clevis,
    wherein the engine is disposed between the front plate and the rear plate,
    wherein a pin passes through a bore in the front plate, a bore in the engine and a bore in the rear plate, and wherein a diameter of the bore in the engine is greater than the diameter of the pin.

5. An aircraft having a structure, an engine and a front engine attachment system according to claim 1,
wherein the engine pylon is fastened to the structure, and
wherein the front part of the engine is fastened to said at least one second connection point.

\* \* \* \* \*